(12) United States Patent
Johnson et al.

(10) Patent No.: US 10,965,071 B1
(45) Date of Patent: Mar. 30, 2021

(54) FLEXIBLE ELECTRICAL RECEPTACLE SYSTEM AND METHOD FOR INSTALLATION THEREOF

(71) Applicants: Mark Johnson, Port Ludlow, WA (US); Annette Johnson, Port Ludlow, WA (US)

(72) Inventors: Mark Johnson, Port Ludlow, WA (US); Annette Johnson, Port Ludlow, WA (US)

(*) Notice: Subject to any disclaimer, the term of this patent is extended or adjusted under 35 U.S.C. 154(b) by 36 days.

(21) Appl. No.: 16/514,017

(22) Filed: Jul. 17, 2019

Related U.S. Application Data

(60) Provisional application No. 62/701,440, filed on Jul. 20, 2018.

(51) Int. Cl.
*H02G 3/12* (2006.01)
*H01R 25/00* (2006.01)
*H01R 43/00* (2006.01)

(52) U.S. Cl.
CPC .......... *H01R 25/006* (2013.01); *H01R 43/00* (2013.01)

(58) Field of Classification Search
CPC ..................................... H02G 3/125
USPC .............................. 174/57, 58; 248/57, 906
See application file for complete search history.

(56) References Cited

U.S. PATENT DOCUMENTS

| | | | | |
|---|---|---|---|---|
| 2,316,389 A * | 4/1943 | Atkinson | ............... | H02G 3/126 248/300 |
| 3,528,636 A * | 9/1970 | Schmidt | .................... | E04B 2/58 248/57 |
| 4,703,593 A * | 11/1987 | Smolik | .................... | E03C 1/322 52/34 |
| 5,386,959 A * | 2/1995 | Laughlin | ................ | H02B 1/015 248/200.1 |
| 5,405,111 A * | 4/1995 | Medlin, Jr. | ............ | H02G 3/125 248/205.1 |
| 5,516,068 A * | 5/1996 | Rice | ......................... | H02G 3/20 248/300 |
| 6,435,903 B1* | 8/2002 | Nelson | ................... | H01R 13/71 174/57 |
| 6,519,791 B2* | 2/2003 | Randolph | ............... | E03C 1/021 4/695 |
| 7,271,335 B2* | 9/2007 | Dinh | ...................... | H02G 3/125 174/50 |
| 7,956,285 B2* | 6/2011 | Tally | ........................ | H02G 1/00 174/58 |
| 8,785,774 B1* | 7/2014 | Gretz | ...................... | H02G 3/125 174/57 |
| 9,261,120 B2* | 2/2016 | Colangelo | ................ | H02G 3/12 |
| 9,397,491 B2* | 7/2016 | Birli | ....................... | H02G 15/10 |
| 9,705,297 B1* | 7/2017 | Nassim | ................... | H02G 3/121 |
| 9,825,446 B2* | 11/2017 | Korcz | .................... | H02G 3/125 |
| 10,361,547 B2* | 7/2019 | Kellerman | ............... | H02G 3/12 |
| 2003/0034167 A1* | 2/2003 | DeLand | ................. | H02G 3/288 174/50 |

(Continued)

*Primary Examiner* — Neil Abrams
(74) *Attorney, Agent, or Firm* — Krista A. Wittman

(57) ABSTRACT

A flexible electrical receptacle system and method for installation is provided. The system includes at least two support bars affixed parallel to one another between two wall support members. A central bar is positioned between the two support bars and configured to move along a length of the parallel support bars. An electrical receptacle affixed to the central bar and configured to move along a length of the central bar.

20 Claims, 10 Drawing Sheets

(56) References Cited

U.S. PATENT DOCUMENTS

2008/0296460 A1* 12/2008 Kerr, Jr. .................. F21V 21/02
                                                          248/343

* cited by examiner

20

55

65

75

90

100

FLEXIBLE ELECTRICAL RECEPTACLE SYSTEM AND METHOD FOR INSTALLATION THEREOF

CROSS-REFERENCE TO RELATED APPLICATION

This non-provisional patent application claims priority under 35 U.S.C. § 119(e) to U.S. Provisional Patent application, Ser. No. 62/701,440, filed Jul. 20, 2018, the disclosure of which is incorporated by reference.

FIELD

The present invention relates in general to electric boxes and, in particular, to a flexible electrical receptacle system and method for installation thereof.

BACKGROUND

During the construction or remodel of homes, office buildings, schools, hospitals and other buildings, electrical boxes are installed to provide electrical power to residents or users of the buildings. Traditionally, a metal or plastic box is installed within a wall to hold electrical cables that provide power via one or more sockets. If a wall is already installed, an electrical box can be installed between wall studs by cutting a hole in the existing wall, placing the electrical box inside the hole, and securing the electrical box to the wall using tabs on the box to clamp to a backside of the wall. In contrast, in a new construction, the electrical box is generally affixed to a wall stud using nails prior to installing the wall.

However, once the wall is installed, moving the electrical box can be difficult and time consuming. Specifically, a large amount of the wall, such as sheetrock, must be removed to access and remove the electrical box from the wall stud, and then reposition the electrical box along the same wall stud or a different stud. Finally, a hole in the wall where the electrical box was originally located, must be patched. Further, cutting a new hole in the wall to reposition the electrical box is not a satisfactory alternative because the originally placed electric box must be moved to patch the hole in the wall made for the original electric box.

Accordingly, an electric box that can be conveniently moved after installation of a wall is needed. Preferably, the moveable electric box reduces an amount of work necessary for the move, including removal of a minimal amount of the installed wall, and provides a secure placement of the electric box

SUMMARY

A flexible electrical receptacle system includes two adjustable support bars that are each positioned horizontally between two wall studs. A flexible electrical receptacle is affixed to a central bar that is adjustably positioned vertically between the two support bars. The central bar can move back and forth between the wall studs, while the electrical receptacle can move up and down along the central bar for secure positioning of the electrical receptacle within the wall to be installed. Additionally, the electrical receptacle can move forward or backward with respect to the central bar to extend, for example, closer to or further from drywall to be placed over a front surface of the electrical receptacle.

An embodiment provides a flexible electrical receptacle system and method for installation. The system includes at least two support bars affixed parallel to one another between two wall support members. A central bar is positioned between the two support bars and configured to move along a length of the parallel support bars. An electrical receptacle affixed to the central bar and configured to move along a length of the central bar.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Electrical boxes once installed can be difficult to move, requiring time and expense. An adjustable electrical receptacle system allows for easier and quicker movement of an electrical box, especially when a wall has already been installed around the electrical box. The electrical receptacle system includes two support bars that are positioned horizontally between two wall studs, which is a vertical member that acts as part of a frame for a wall. A central bar with an electrical box affixed is moveably positioned between the support bars to all positioning of the electrical box between the wall studs by moving the electrical box left or right between the support bars or up or down along the central bar.

Figure 1:
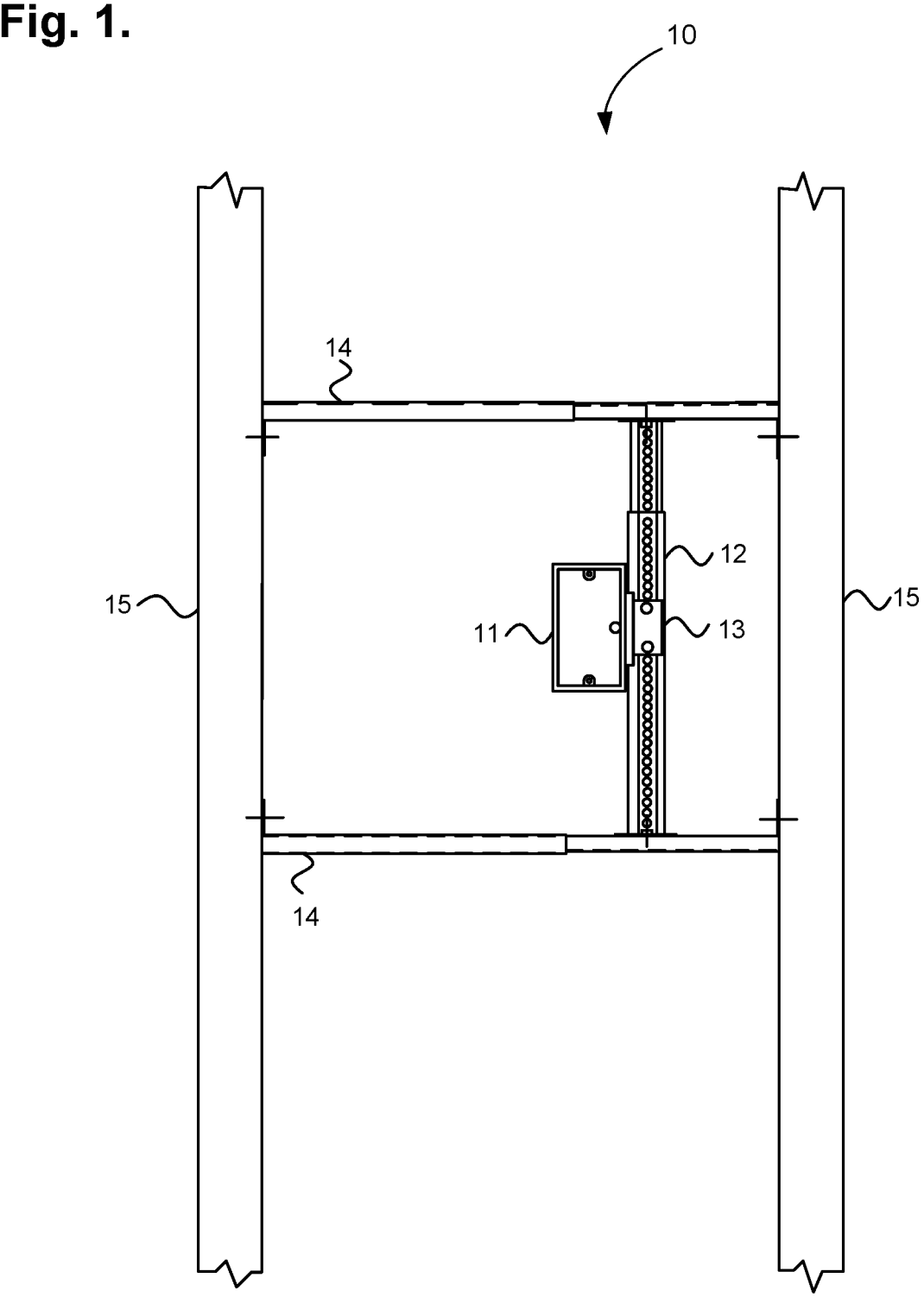
FIG. 1 is a front view of a flexible electrical receptacle system installed between wall studs, in accordance with one embodiment.

The adjustable electrical receptacle system allows an installer to easily move an electrical receptacle to a desired position for secure installation between wall studs, as well as for repositioning of the electrical receptacle after a wall has been installed. FIG. 1 is a front view of a flexible electrical receptacle system 10 installed between wall studs, in accordance with one embodiment. Two adjustable support bars 14 are installed horizontally between two wall studs 15 via fasteners (not shown). The support bars 14 are adjustable to fit various distances between the studs 15, including 16 or 24 inches and can be nailed to the wall studs 15 via a fastener (not shown) on each end of the support bars 14. The support bars 15 can be made from metal, steel, plastic, or other material. At a minimum, the bars should be adjustable to fit between wall studs of varying distances.

An electrical receptacle 11 is adjustably affixed to a central bar that is moveably positioned between the support bars 14. The electrical receptacle 11 can be made from metal, steel, plastic or other material and can have the shape of a rectangle, oval, circle, polygon, or square, and can be an electrical box, a media box, or a low voltage box. Other types of materials and shapes of the electrical receptacle are possible, as well as other types of boxes. At a minimum, the electrical receptacle includes a back surface and walls surrounding the back surface to create a void within the walls of the electrical receptacle to hold electrical cables and wires. The electrical receptacle can be affixed to the central bar via a bracket 13, which can slide up and down along the central bar 12. The central bar 12 moves back and forth along the support bars, moving the electrical box to a desired position between the wall studs. The wall studs act as a frame for the wall and can be vertical or horizontal. Once positioned, electrical wires are strung through the electrical box and connected to one or more sockets for use as an electrical outlet.

Figure 2:
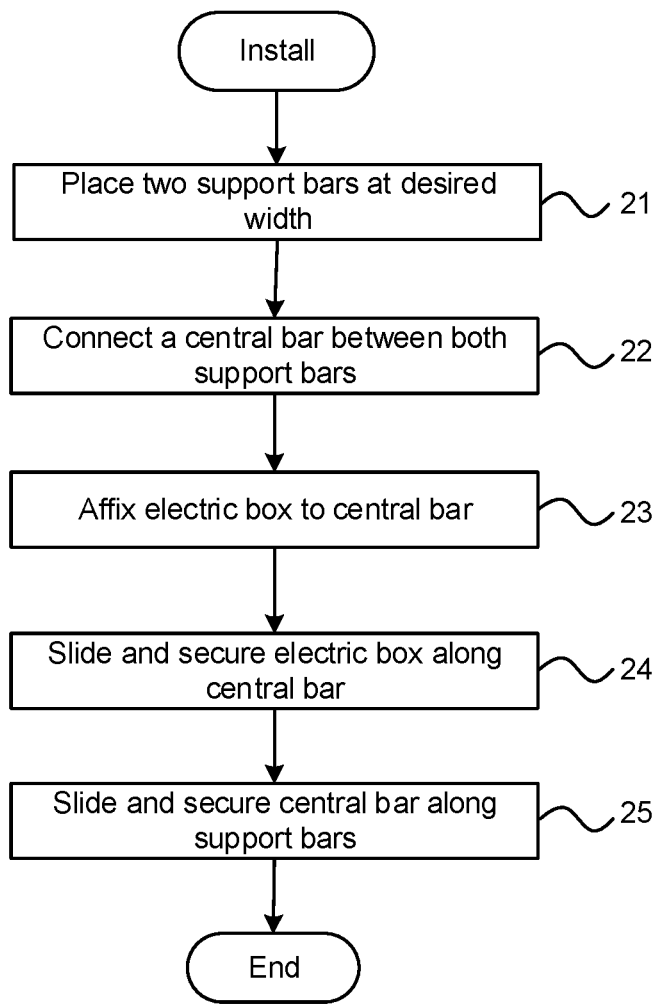
FIG. 2 is a flow diagram showing a method for installing the flexible electrical receptacle system of FIG. 1, in accordance with one embodiment.

Installation of the electrical box system provides a structure for easy and accessible movement of the electrical box. FIG. 2 is a flow diagram showing a method 20 for installing the flexible electrical receptacle system of FIG. 1, in accordance with one embodiment. Two support bars are each affixed (block 21) between a pair of wall studs, over which a wall can be installed. A distance between the support bars can vary based on a desired position of the electrical receptacle. In one embodiment, each support bar can include a single bar. However, in a further embodiment, each bar can include two or more bars that are positioned to slide with respect to one another in a telescoping manner. Each support bar can optionally include a row of holes along a center of the bar, which can be used to connect with a central bar. The central bar is positioned (block 22) between both support bars via a fastener on each end of the central bar. The distance between the support bars is dependent on a length of the central bar or alternatively, the length of the central bar is dependent on a width between the parallel support bars. A screw can connect and secure each of the fasteners of the central bar to the support bars by aligning a hole in each fastener with at least one of the holes in each support bar and filing the aligned holes with a screw. However, other types of fasteners can be used, especially, when the support bars do not include the holes.

An electrical receptacle is affixed (block 23) to the central bar via a bracket. As described above with respect to FIG. 1, the electrical receptacle is formed into a shape with a back platform and walls surrounding the back platform, leaving an opening across from the back platform open. The open end of the electrical receptacle should face the side of the wall to be installed.

Figure 3:
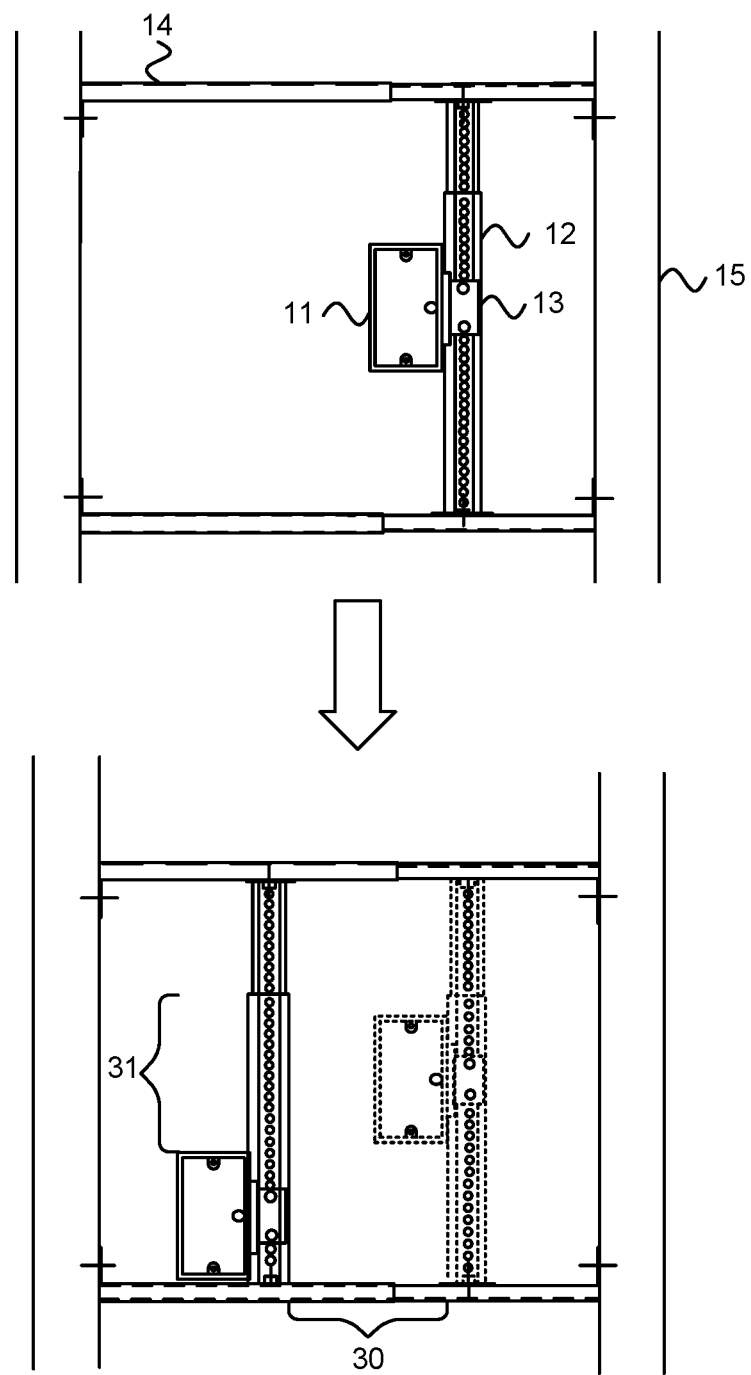
FIG. 3 is a block diagram showing, by way of example, movement of an electrical receptacle of the flexible electrical receptacle system of FIG. 1 to a different position.

Once affixed, the bracket can slide up and down (block 24) the central bar to move the electrical receptacle to a desired height, such as measured from the floor to which the wall studs are attached. Also, the electrical receptacle can be moved back and forth (block 25) between the wall studs by moving the central bar along the two support bars to a desired distance from the wall studs. For example, FIG. 3 is a block diagram showing, by way of example, movement 30, 31 of an electrical receptacle of the flexible electrical receptacle system of FIG. 1 to a different position. The electrical receptacle 11 is first positioned near the right wall stud 15, in a center between the two support bars 14. Subsequently, a user slides the central bar 14 to the left 30, along the two support bars 14, towards the left wall stud 15 until the electrical receptacle 11 is in a desired position. Once positioned, one or more screws can be used to secure the central bar 12 to the support bars 15, as discussed in further detail below with respect to FIG. 5. Alternatively, a fastener with a push spring can be used to affix the central bar to the support bars, as further discussed in detail below with respect to FIG. 5.

Also, if desired, a height of the electrical receptacle 11 can be changed 31, by sliding the electrical receptacle 11 along the central bar 12 via the bracket 13. Upon positioning, one or more screws can be used to secure the bracket at the desired position along the central bar 12, as described below in detail with respect to FIGS. 6 and 7. Further, the electrical receptacle 11 can move forward towards or past a front of the central bar 12 or move backward towards or past a back of the central bar 12, and can be secured in place via a screw or other fastener, as further described below with reference to FIG. 6. Returning to the discussion with respect to FIG. 2, one or more steps for installation of the flexible electrical receptacle system and movement of the electrical receptacle within the system can occur concurrently or in a different order.

Figure 4:
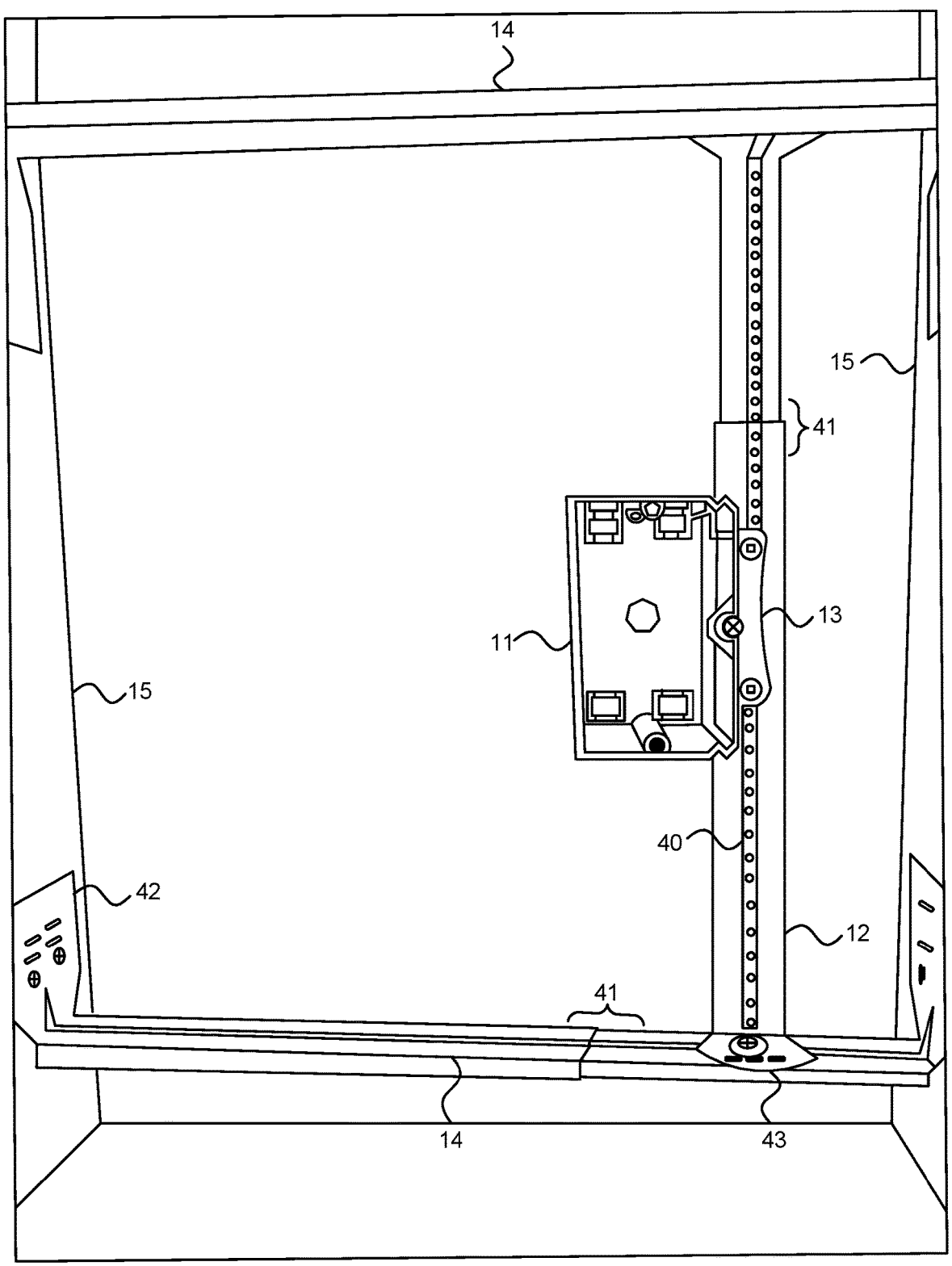
FIG. 4 is a front view showing, by way of example, the flexible electrical receptacle system of FIG. 1 installed in a building structure.

The flexible electrical receptacle system allows secure placement of the electrical receptacle between wall studs and also, provides a convenient mechanism for changing a position of the electrical receptacle even after a wall has been built over the electrical receptacle. FIG. 4 is a front view 45 showing by way of example, the flexible electrical receptacle system of FIG. 1 installed in a building structure. The support bars 14 can be affixed to the wall studs 15 via fasteners 42 on each end of the bars 14. Each fastener 42 can be positioned at a right angle to the support bar 14 on which that fastener 42 is attached and is affixed to the wall stud 15 by one or more nails. Other types of fasteners are possible and positioning of the fasteners are possible. For example, the fasteners can be affixed to the studs via screws, staples, or glue.

The support bars 14 can be metal, steel, plastic, or other types of material. At a minimum, the support bars 14 should each be adjustable to fit varying distances between the wall studs. For example, the support bars can each include two or more rails 41 that telescope or slide against one another. In one embodiment, each support bar 14 can include two rails, each having a line of holes 40 in a center of that rail, with one rail having a slightly larger width to surround a smaller rail that can slide in and out of the larger rail to adjust a length of the support bar to fit between the wall studs. When each support bar is a desired length, one or more screws can be placed within aligned holes of the two rails to ensure that the rails do not move with respect to one another. Alternatively, springs can be included within the support bars to adjust the length and prevent sliding.

The central bar 12 is positioned between the two support bars 14 and secured via fasteners 43 affixed to each side of the central bar 12. Similar to the support bars 14, the central bar 12 can be adjustable and include a strip of holes 40 along a center of the bar. The central bar 12 can also be made of metal, steel, or plastic, as well as other types of material, and can include at least two rails 41 that slide along each other to increase or decrease a length of the central bar 12.

Alternatively, each of the central bar and support bars can be formed from a single rail. In one example, the central bar 12 can be the same type of bar as the support bars.

The fasteners 42, 43 of each support bar 14 and the central bar 12 can include a flat piece of material, such as metal, that extends perpendicularly from each end of the support bars 14 and the central bar. One or more holes can be formed in the flat piece of material to receive a screw for fastening the fastener to the stud or central bar. However, other mechanisms for fastening the fastener to the stud or central bar are possible, such as nails, push springs, and stapes. To move the support bar or central bar, the screws must first be removed. Once the support bar or central bar is moved to a desired position, the screws can again be placed in the holes.

Figure 5:
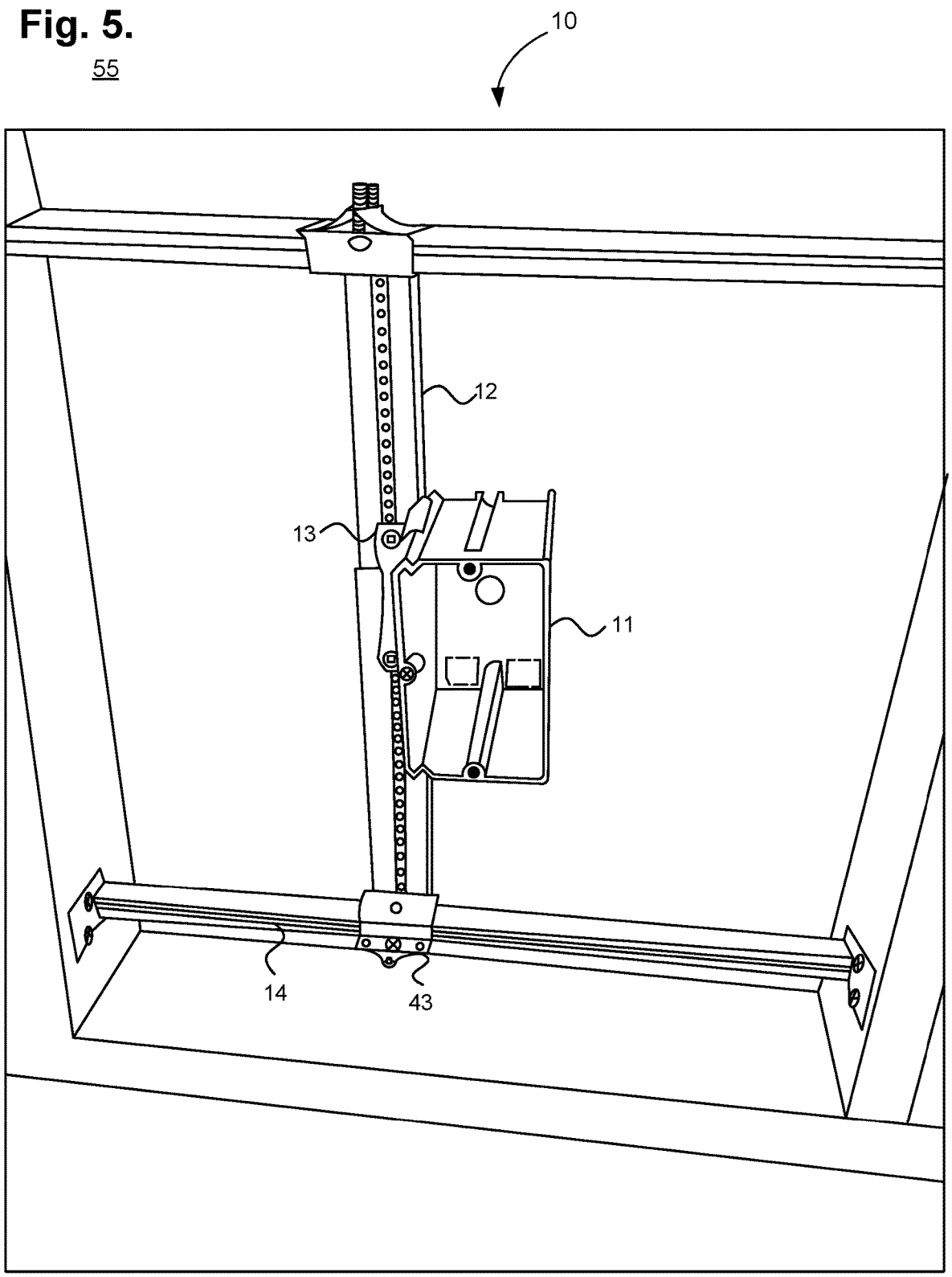
FIG. 5 is a front view showing, by way of example, the flexible electrical receptacle system of FIG. 1 with tension loaded fasteners.

Since the central bar 12 is often repositioned along the support bars 14, a tension loaded fastener can be utilized to prevent a user from having to completely remove and then replace the screws every time the central bar 12 is moved. FIG. 5 is a front view 55 showing, by way of example, the flexible electrical receptacle system of FIG. 1 with tension loaded fasteners. Each fastener 43 on the central bar 12 can include two curved pieces that each surround half of one support bar 14 as a bracket. The curved pieces can each be formed as a U-shape with flat surfaces that extend perpendicular from each top end of arms of the U-shape. The flat surfaces of the curved pieces align and include a hole in which a screw can be received. A pair of the aligned flat surfaces connect to the central bar 12 such as via the screw, and the other pair of flat surfaces are used to increase or decrease tension between the curved pieces surrounding the support bar via the screw. For example, the tighter the screw is positioned, the tighter the U-shaped pieces surround the support bar, which prevents movement. To move the central bar, the screw is loosened to slide the central bar along the support bars and then tightened once the central bar is in a desired position.

In a further embodiment, a fastener with a push spring, instead of a screw, can be used to affix the central bar to the support bars. For example, the fastener can include a U-shape body that surrounds a portion of a support bar and a push spring is placed on one of the arms of the U-shaped body. The push spring releases pressure on the support bar, on which the fastener is placed, when a user presses the push spring in. In contrast, the push spring provides pressure on the support bar to prevent movement of the central bar when there is no interference by a user. Accordingly, to move the central bar, the user can push down on the push springs of the fastener on each side of the central bar.

In addition to moving the central bar along the support bars, the electrical receptacle is also moveable along the central bar. The electrical receptacle 11 is affixed to the central bar 12 via the bracket 13. The electrical receptacle 11 can be a standard electric box, electrical switch box, junction box, new work box, or old work box, and can be made from metal or plastic. The shape of the electrical receptacle 11 can be a rectangle, circle, square, or octagon. Other box materials for and shapes of the electrical receptacle are possible.

Figure 6:
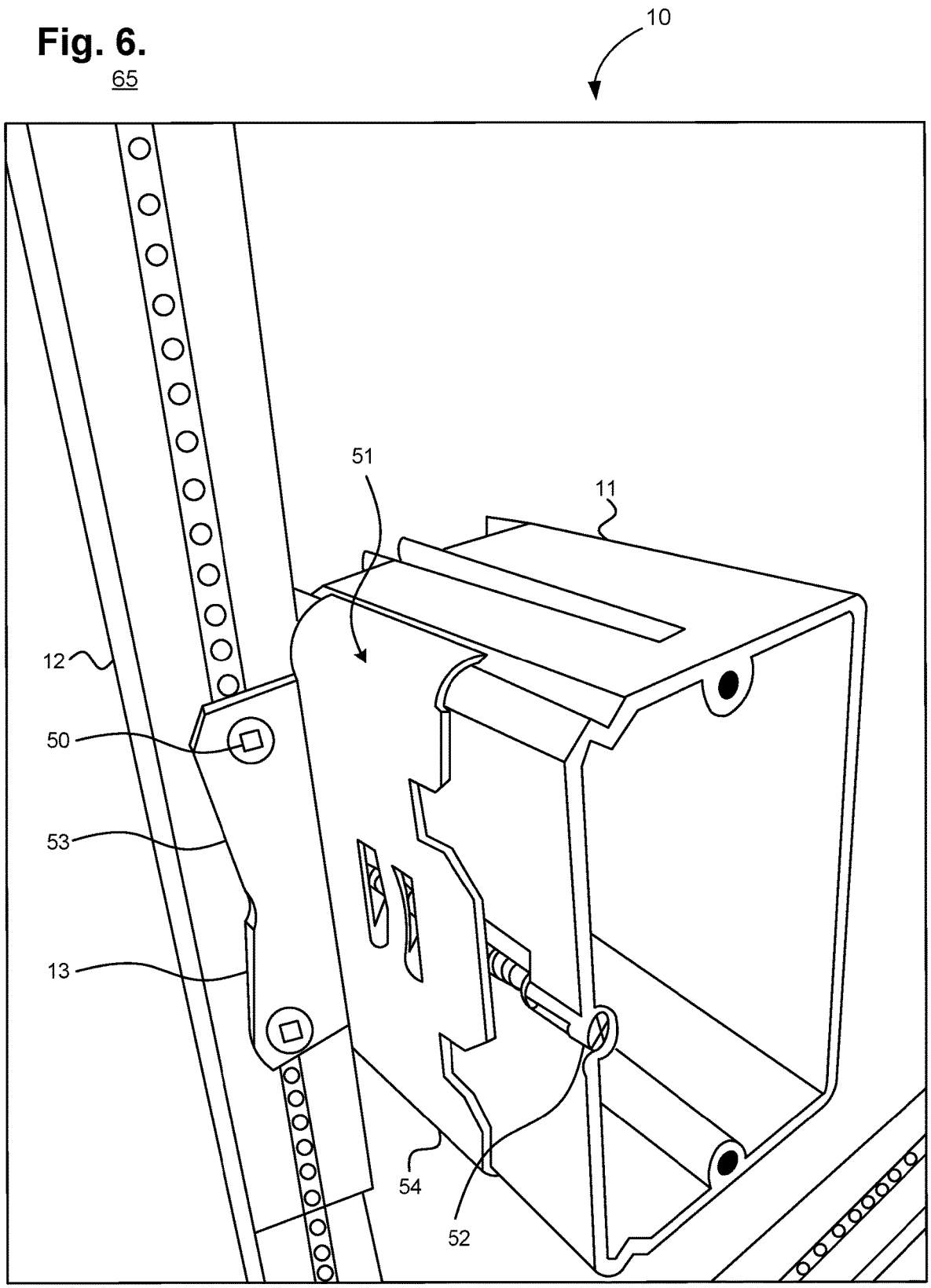
FIG. 6 is perspective view showing a front of the flexible electrical receptacle affixed to a bracket.

The shape of the bracket to which the electrical receptacle is attached can be dependent on the shape of the electrical receptacle. FIG. 6 is perspective view 65 showing a front of the flexible electrical receptacle of FIG. 3 affixed to a bracket. The bracket 13 can be made from metal, steel, or plastic, as well as from other types of materials, and can have an L-like shape that includes two sides 53, 54 that form a right angle. One side of the bracket 53 has at least one hole and is affixed to the central bar 12 via one or more screws 50. The other side 54 of the bracket includes one or more fasters 51 that grip the electrical receptacle 11 and at least one screw hole (not shown). For instance, the electrical receptacle 11 can slide into the fasteners 51 of the bracket 13 and a screw is then inserted through a hole or groove 52 in the electrical receptacle that aligns with the holes of the bracket to secure the electrical receptacle 11 to the bracket 13.

The screw and groove 52 allow the electrical receptacle 11 move forward towards or past a front of the central bar 12 or move backward towards or past a back of the central bar 12. However, other mechanisms, such as a push spring connection or tension loaded fastener between the bracket 53 and the central bar 12 are possible and can include fasteners 51 for the electrical box 11. Back and forth movement of the electrical receptacle 11 allows easy placement at a desired position, including a position where a front surface of the electrical receptacle 11 is flush with drywall to be placed over the receptacle.

Figure 7:
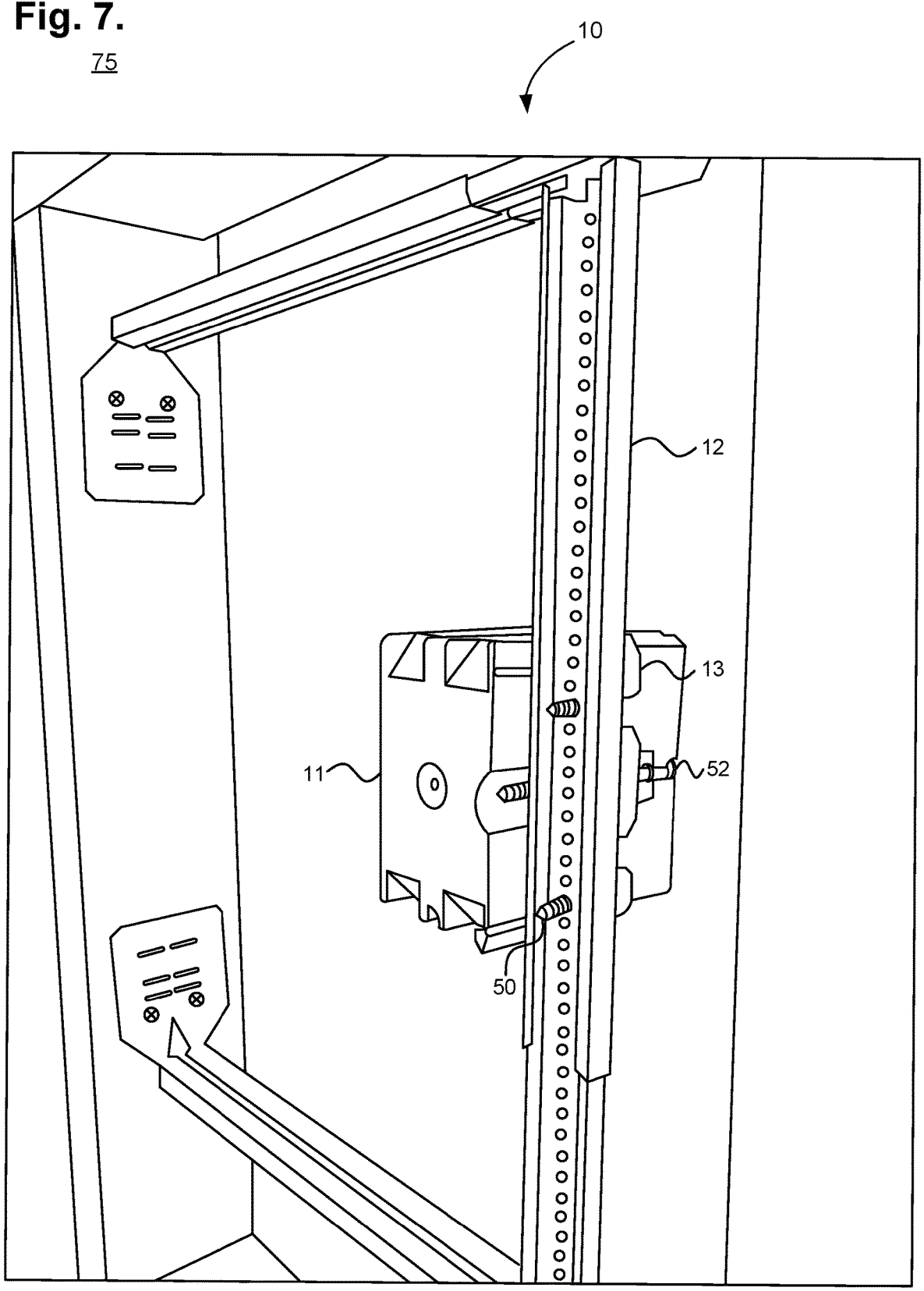
FIG. 7 is perspective view showing a back of the flexible electrical receptacle.

When used, the screws 50 connecting the bracket to the central bar and the electrical receptacle to the bracket can extend to a back side of the flexible electrical receptacle system. FIG. 7 is perspective view 75 showing a back of the flexible electrical receptacle of FIG. 3 affixed to a bracket and the central bar. The electrical receptacle 11 is affixed to the bracket 13 via the screw 52, while the bracket 13 is affixed to the central bar 12 via one or more screws 50. The screws 50 extend to a backside of the central bar 12, and the screw 52 securing the electrical receptacle 11 to the bracket 13 also extends to a back side of the central bar 12.

To move the electrical receptacle 11 up or down along the central bar 12, the screws 50 can be removed from the central bar 12 and bracket 13, which can slide along the central bar 12 to a desired position. At the desired position, the screws 50 are replaced through the holes in the bracket and the central bar. Additionally, the central bar 12 can be moved along the support bars by removing the screws through the holes of the fasteners on the central bar and the holes in the support bars. Upon moving the central bar to a desired position for the electrical receptacle, the screws are replaced in one or more holes of the central bar fasteners and different holes of the support bars.

Figure 8:
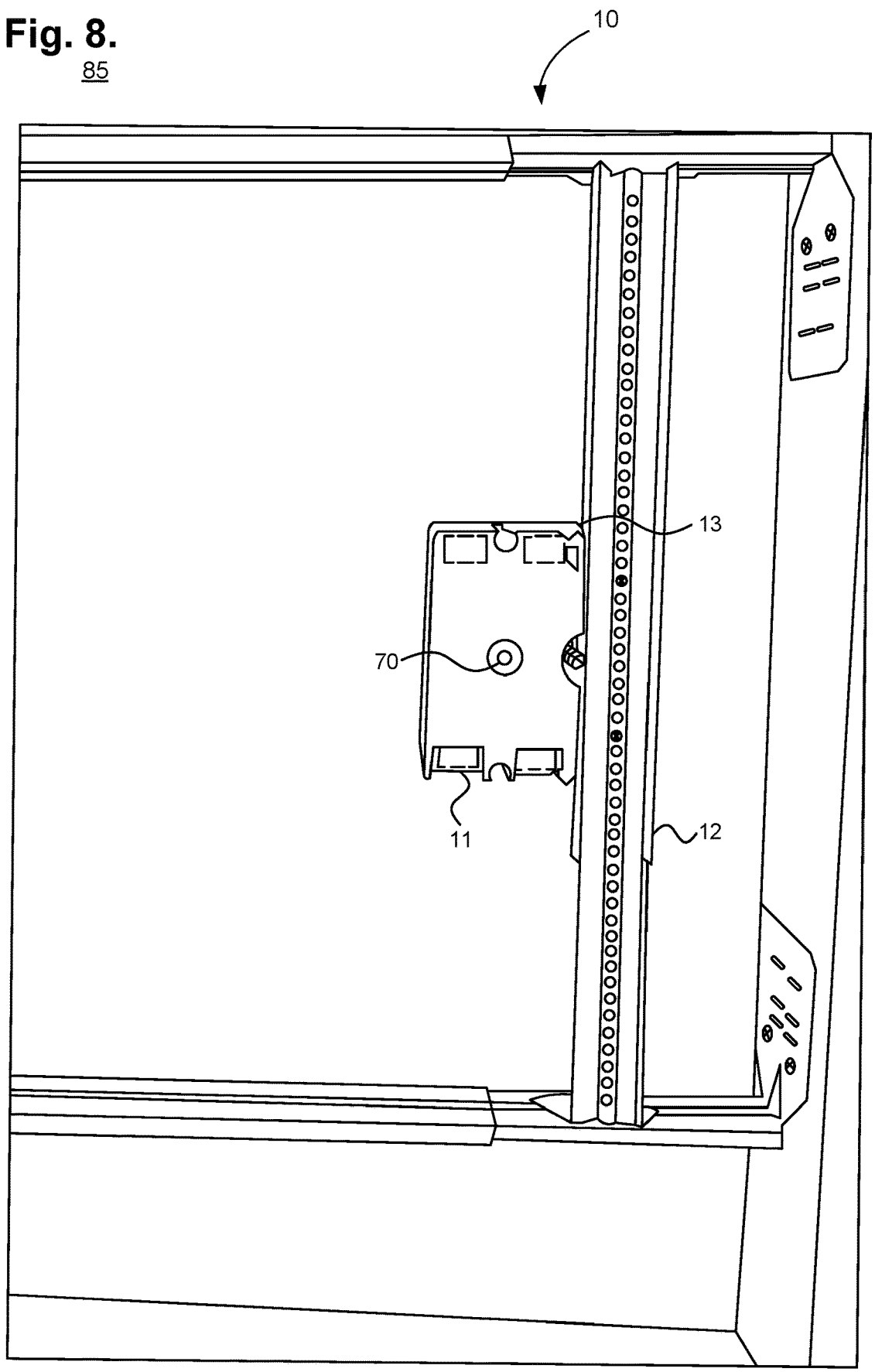
FIG. 8 is a back view showing, by way of example, the flexible electrical receptacle of FIG. 3.

Once the electrical receptacle is positioned, one or more holes can be drilled through a back of the electric receptacle, if a hole is not already present. FIG. 8 is a back view 85 showing, by way of example, the flexible electrical receptacle 11 of FIG. 1. The electrical receptacle 11 is affixed to the central bar 12 via the bracket 13. One or more holes 70 are provided in the electrical receptacle to allow electrical wires and cables to enter the electrical receptacle for connecting with an electrical interface, such as one or more sockets. Additionally, a cover can be placed over the open end of the electric box and the sockets. Subsequently, a plug can be inserted in the socket to receive electrical power.

Figure 9:
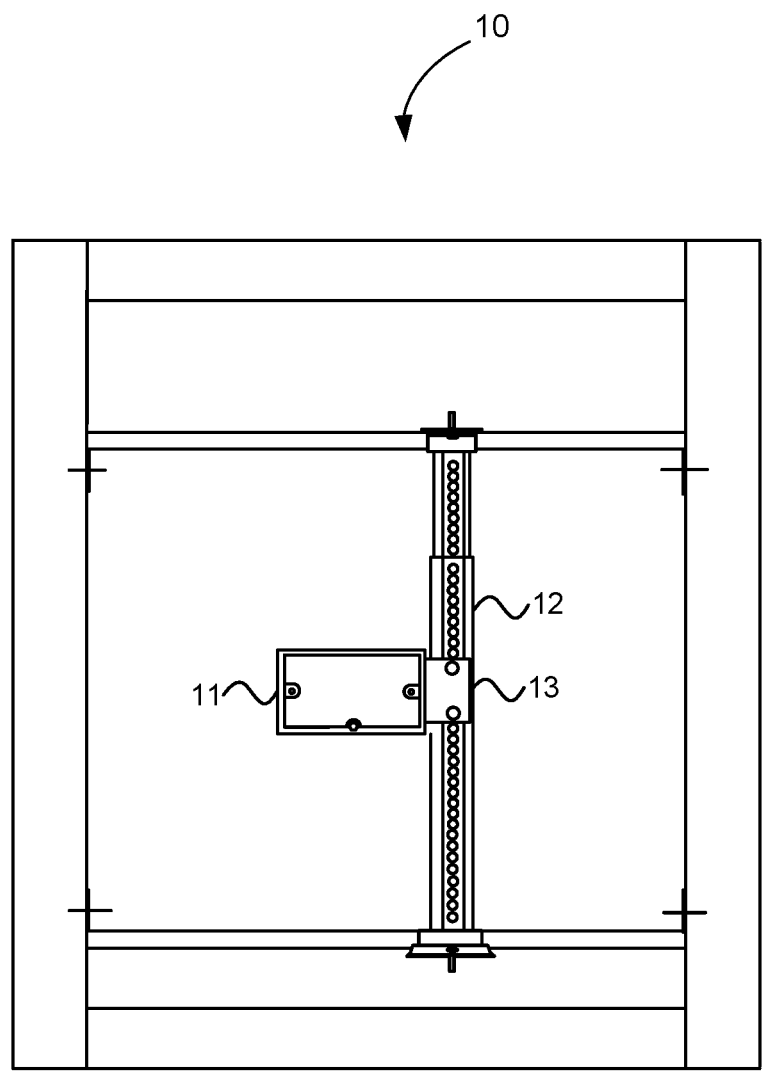
FIG. 9 is a front view 90 of the flexible electrical receptacle of FIG. 1 in a different position.

Although the electrical receptacle has been described above and shown in the figures as a rectangle that is placed with the longer sides of the rectangular vertically positioned. However, the rectangular electrical receptacle can also be affixed with the longer sides horizontally positioned. FIG. 9 is a front view 90 of the flexible electrical receptacle of FIG. 1 in a different position. The electrical receptacle 11 is affixed to the central bar 13 via a bracket 13. Specifically, the electrical receptacle 11 can be rectangular shaped and the one of the short ends of the rectangle can be affixed to the bracket 13. Other shapes and configurations of the electrical receptacle are possible.

Figure 10:
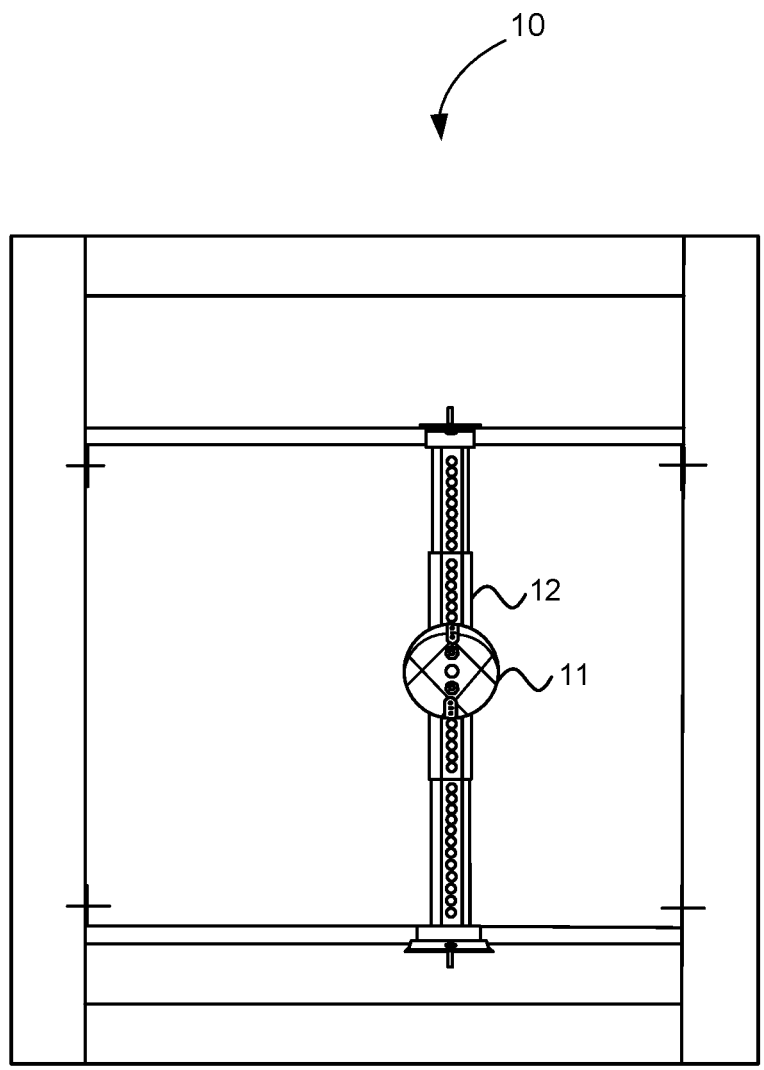
FIG. 10 is a front view 100 of the flexible electrical receptacle of FIG. 1 in a different shape.

For example, the electrical receptacle 11 can be shaped as a square, circle, oval, triangle, diamond, or sphere, as well as other shapes. FIG. 10 is a front view 100 of the flexible electrical receptacle of FIG. 1 in a different shape. The electrical receptacle 11 is shaped as a circle. A hole is formed within the circular housing of the receptacle through which wires are strung for placement in the receptacle.

Further, the electrical receptacle system can also be installed between other support members of a building, including ceiling joists and trusses, as well as other types of support members. In one example, the support bars can be affixed between the ceilings joints and the central bar and electrical receptacle are positioned between the support bars. Such placement would allow a user to obtain power via the ceiling, which can be useful for hanging lights, clocks, and other products or instruments requiring power.

While the invention has been particularly shown and described as referenced to the embodiments thereof, those skilled in the art will understand that the foregoing and other changes in form and detail may be made therein without departing from the spirit and scope of the invention.

What is claimed is:

1. A flexible electrical receptacle system, comprising:
    at least two support bars each affixed horizontally between two wall support members, wherein the two support bars are parallel to one another;
    a central bar positioned perpendicular between the two support bars and configured to move along a length of the horizontal support bars;
    an electrical receptacle affixed to the central bar and configured to move along a length of the central bar.

2. A system according to claim 1, wherein the electrical receptacle holds electrical wires that connect to a backside of an electrical outlet.

3. A system according to claim 1, wherein the electrical receptacle is configured to move back and forth with respect to the central bar.

4. A system according to claim 1, further comprising:
    a fastener on each end of each support bar, wherein each fastener is connected to the one of the wall support members.

5. A system according to claim 4, wherein the fasteners of the support bars are affixed to the wall support members via one or more of nails, staples, screws, and glue.

6. A system according to claim 1, wherein each of the central bar and the support bars are adjustable in length.

7. A system according to claim 1, further comprising:
    a bracket comprising two sides that form a right angle, wherein one side is affixed to the central bar and the other side includes one or more fasteners to secure the electrical receptacle.

8. A system according to claim 1, wherein the wall support members comprise at least one of wall studs, ceiling joists, and trusses.

9. A system according to claim 1, wherein fasteners are positioned on each end of the central bar and the fasteners are configured to secure or allow movement of the central bar along the support bars.

10. A system according to claim 1, wherein a shape of the electrical receptacle can include one of a rectangle, circle, square, triangle, diamond, and sphere.

11. A method for installation of a flexible electrical receptacle system, comprising:
    affixing each of at least two support bars horizontally between two wall support members, wherein the two support bars are parallel to one another;
    positioning a central bar perpendicular between the two support bars, wherein the central bar is configured to move along a length of the parallel horizontal support bars;
    affixing to the central bar an electrical receptacle that is configured to move along a length of the central bar.

12. A method according to claim 11, wherein the electrical receptacle holds electrical wires that connect to a backside of an electrical outlet.

13. A method according to claim 11, wherein the electrical receptacle is configured to move back and forth with respect to the central bar.

14. A method according to claim 11, further comprising:
    connecting a fastener on each end of each support bar to one of the wall support members.

15. A method according to claim 14, wherein the fasteners of the support bars are affixed to the wall support members via one or more of nails, staples, screws, and glue.

16. A method according to claim 11, wherein each of the central bar and the support bars are adjustable in length.

17. A method according to claim 11, further comprising:
    affixing a bracket comprising two sides that form a right angle to the central bar via one side and securing the other side of the bracket to the electrical receptacle via one or more fasteners.

18. A method according to claim 11, wherein the wall support members comprise at least one of wall studs, ceiling joists, and trusses.

19. A method according to claim 11, wherein fasteners are positioned on each end of the central bar and the fasteners are configured to secure or allow movement of the central bar along the support bars.

20. A method according to claim 11, wherein a shape of the electrical receptacle can include one of a rectangle, circle, square, triangle, diamond, and sphere.

* * * * *